US009681155B2

(12) United States Patent
Laan

(10) Patent No.: US 9,681,155 B2
(45) Date of Patent: Jun. 13, 2017

(54) RECOVERY FROM PACKET LOSS DURING TRANSMISSION OF COMPRESSED VIDEO STREAMS

(71) Applicant: Sony Interactive Entertainment America LLC, San Mateo, CA (US)

(72) Inventor: Roger Van der Laan, Redwood City, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 814 days.

(21) Appl. No.: 13/837,541

(22) Filed: Mar. 15, 2013

(65) Prior Publication Data

US 2014/0269917 A1 Sep. 18, 2014

(51) Int. Cl.

| | |
|---|---|
| ***H04N 7/36*** | (2006.01) |
| ***H04N 11/02*** | (2006.01) |
| ***H04N 19/895*** | (2014.01) |
| ***H04N 19/105*** | (2014.01) |
| ***H04N 19/166*** | (2014.01) |
| ***H04N 19/174*** | (2014.01) |
| ***H04N 19/65*** | (2014.01) |

(52) U.S. Cl.

CPC ......... *H04N 19/895* (2014.11); *H04N 19/105* (2014.11); *H04N 19/166* (2014.11); *H04N 19/174* (2014.11); *H04N 19/65* (2014.11)

(58) Field of Classification Search

None

See application file for complete search history.

(56) References Cited

U.S. PATENT DOCUMENTS 6,201,834 B1 * 3/2001 Zhu .................... H04N 21/2381 375/240.27
2007/0124754 A1 * 5/2007 Miyauchi ............... H04H 60/04 725/8
2010/0020867 A1 * 1/2010 Wiegand ................ H04N 19/34 375/240.02
2010/0046634 A1 * 2/2010 Dai .................. H04N 21/23418 375/240.25

OTHER PUBLICATIONS

John G. Apostolopoulos, "Reliable Video Communication over Lossy Packet Networks using Multiple State Encoding and Path Diversity," Client and Media Systems Laboratiory, Nov. 28, 2001, Visual Communications and Image Processing (VCIP), Jan. 2001.*

* cited by examiner

*Primary Examiner* — Mikhail Itskovich
*Assistant Examiner* — Edemio Navas, Jr.
(74) *Attorney, Agent, or Firm* — Martine Penilla Group, LLP

(57) ABSTRACT

A method for delivering video over a network includes encoding, by a hosting service, a moving picture which includes a sequence of video frames as a primary compressed video stream and a secondary compressed video stream comprising a subset of the primary compressed video stream. The primary and secondary compressed video streams are then and the secondary compressed video stream transmitted over a network to a client device. The client device selects the primary compressed video stream for decoding in the absence of packet loss; however, if packet loss is detected, the client device selects the secondary compressed video stream for decoding.

20 Claims, 7 Drawing Sheets

RECOVERY FROM PACKET LOSS DURING TRANSMISSION OF COMPRESSED VIDEO STREAMS

TECHNICAL FIELD

The present disclosure relates generally to transmission of compressed video over computer networks; more specifically, to methods and apparatus for mitigating the effects of packet loss which occur when one or more packets of digital data travelling across a computer network fail to reach their destination intact.

BACKGROUND

Remote hosting of online, fast-action, interactive video games and other high-end video applications typically requires very low latencies. For example, for twitch video games and applications, low round-trip latency, as measured from the time a user's control input is sent to the hosting service center to the time that the newly generated video content appears on the screen of the user's client device, is typically required. At higher latencies, performance suffers noticeably. Achieving such low latencies over the Internet or other similar networks requires the video compressor at the hosting service to generate a packet stream with particular characteristics such that the packet sequence flowing through the entire path from the hosting service to the client device is not subject to delays or excessive packet loss. In addition, the video compressor must create a packet stream which is sufficiently robust so that it can tolerate the inevitable packet loss and packet reordering that occurs in normal Internet and network transmissions.

In streaming video technologies, lost or dropped packets can result in highly noticeable performance issues, potentially causing the screen to completely freeze for a period of time or show other visual artifacts (e.g., jitter). If a lost/delayed packet causes the loss of a key frame (i.e., I-frame), then the decompressor on the client device will lack a reference for all of the P-frames that follow until a new I-frame is received. Similarly, if a P frame is lost, that will impact the P-frames that follow. Depending on how long it will be before an I-frame appears, this can have a significant visual impact. (As is well-known, I-frames are the only type of frame that is not coded with reference to any other frame, P-frames are coded predicatively from a previous I-frame or P-frame; B-frames are coded predicatively from I-frames and P-frames. In order to be properly decoded, a B-frame associated with a group of pictures ("GOPs") may need to reference the I-frame of a next GOP. In the context of the present disclosure, the term "I-frame" is intended to broadly refer to an Inter-frame and its equivalents, e.g., an IDR frame in the case of H.264.)

A variety of mechanisms have been developed for handling packet loss. For instance, when packet loss occurs in network transport protocols such as Transmission Control Protocol (TCP), any segments that have not been acknowledged are simply resent. But the problem with such approaches is that they are often unfeasible or impractical in streaming video technologies where it is essential to maintain high data rates and throughput.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF EXAMPLE EMBODIMENTS

Figure 1:
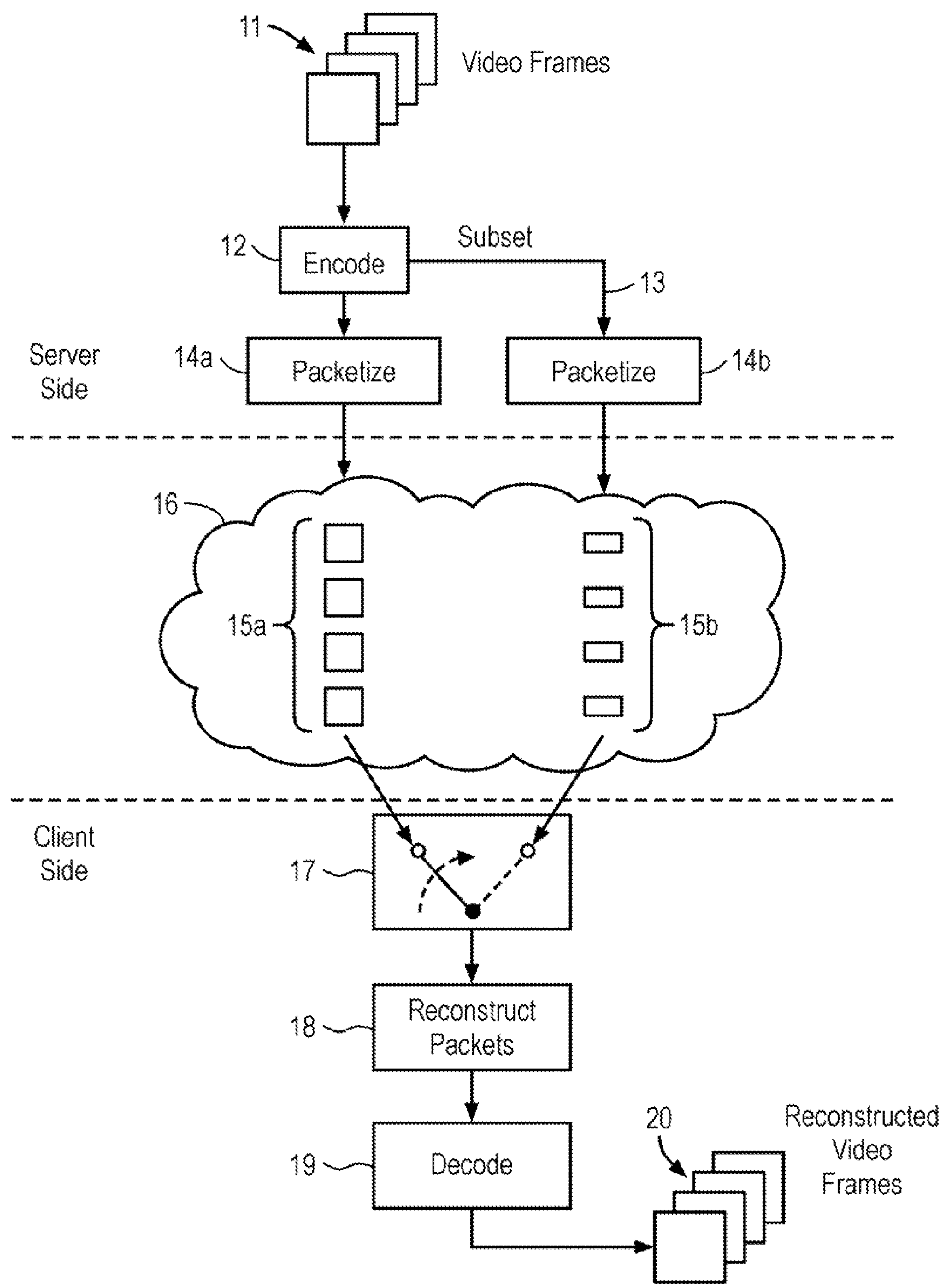
FIG. 1 is an example network diagram illustrating one embodiment for effectively dealing with packet loss.

In the following description, numerous specific details are set forth in order to provide a thorough understanding of the embodiments described. It will be apparent, however, to one having ordinary skill in the art that the specific details may not be needed to practice the embodiments described. In other instances, well-known apparatus or methods have not been described in detail in order to avoid obscuring the embodiments disclosed.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art.

In the context of the present disclosure, a video "encoder" broadly refers to a device, circuit or algorithm (embodied in hardware or software) that compresses (i.e., encodes) video data using fewer bits/bytes to reduce the size of the original video data. Data compression is also frequently referred to as source coding, i.e., coding of data performed at the source before it is either transmitted or stored. Conversely, a video "decoder" or decompressor is a device, circuit or algorithm which performs the reverse operation of an encoder, undoing the encoding to retrieve the original (decompressed) video data.

The term "server" broadly refers to any combination of hardware or software embodied in a computer (i.e., a processor) designed to provide services to client devices or processes. A server therefore can refer to one or more computer processors that run a server operating system from computer-executable code stored in a memory, and which is provided to the user as virtualized or non-virtualized server; it can also refer to any software or dedicated hardware capable of providing computing services.

A "client device" refers a computer device such as a PC, desktop computer, tablet, mobile, handheld, set-top box, or any other general purpose computer (e.g., Microsoft Windows- or Linux-based PCs or Apple, Inc. Macintosh computers) having a wired or wireless connection to a public network such as the Internet, and which further includes the ability to decompress/decode compressed packet data received over a network connection. The client device may include either an internal or external display device for displaying one of the many digital images (compressed or uncompressed) which comprise a movie or video (i.e., a live or moving picture).

A video "frame" refers one of the many digital images (compressed or uncompressed) which comprise a movie or video (i.e., a live or moving picture). When video is displayed, each frame of the moving picture is flashed on a screen for a short time (nowadays, usually 1/24, 1/25, 1/30 or 1/60 of a second) and then immediately replaced by the next one. The human attribute of persistence of vision blends the frames together, such that a view perceives a live, or real-time moving picture. A frame can be divided up into regions of an image, which are commonly referred to as "tiles" or "slices." For instance, in the H.264/AVC standard a frame can be composed of a single slice or multiple slices.

In the context of the present disclosure, the term "packet loss" refers broadly to the occurrence of when one or more packets travelling across a computer network fail to reach their destination, or when one or more packets transmitted over a network arrive at their destination with errors.

FIG. 1 is an example network diagram illustrating one embodiment for effectively dealing with packet loss. As shown, a plurality of video frames 11 is compressed (coded) by an encoder 12 to produce a primary stream of compressed video data as well as a subset stream containing key minimal data. Key data would differ among embodiments and would depend on specific application. The additional stream may be transmitted at considerably lower bitrates than the normal stream. The subset stream, or sub-stream, is shown by arrow 13. After encoding, the primary and subset streams are packetized by packetize devices 14*a* and 14*b*, respectively, before being transmitted, substantially simultaneously, to the client over network 16. Thus, for every slice, the hosting service not only sends the normal video stream, but also a subset of that stream in separate network packets.

In one embodiment, the subset stream contains only motion vectors. In another embodiment, subset stream contains motion vectors and residuals. Motion vectors represent the spatial displacement or "delta" between two successive image areas (e.g., frame-to-frame).

In the embodiment shown, information that leads to one possible encoding (i.e., motion vectors/residuals) is separated from the actual encoding, and then sent downstream so that the decoder may make best use of it as can in the event that packet loss occurs. In other words, the decoder may utilize the motion vectors to construct the frame as best as possible. Practitioners in the art will appreciate that the additional sub-stream may be transmitted at considerably lower bit rates than the normal or primary stream. This is represented in FIG. 1 by the smaller-sized sub-stream packets 15*b* shown being transmitted over network 16, as compared with the primary packet stream 15*a*.

On the client side, both the primary stream and the sub-stream are received at switching device 17, which may comprise a router, switch, or other network switching device that may be used to select between the primary and sub-stream. Switching device 17 normally selects the primary stream, which is then fed into packet reconstruction device 18. The reconstructed packets are then decoded by the decoder 19 to produce the reconstructed video frames 20 for display on the client device. In the event that packet loss is detected, switching device 17 switches from the primary stream to the sub-stream. The sub-stream information is used by decoder 19 to make a prediction of, or otherwise reconstruct, the desired frame. Afterwards, switching device 17 switches back to the normal or primary packet stream.

Figure 2:
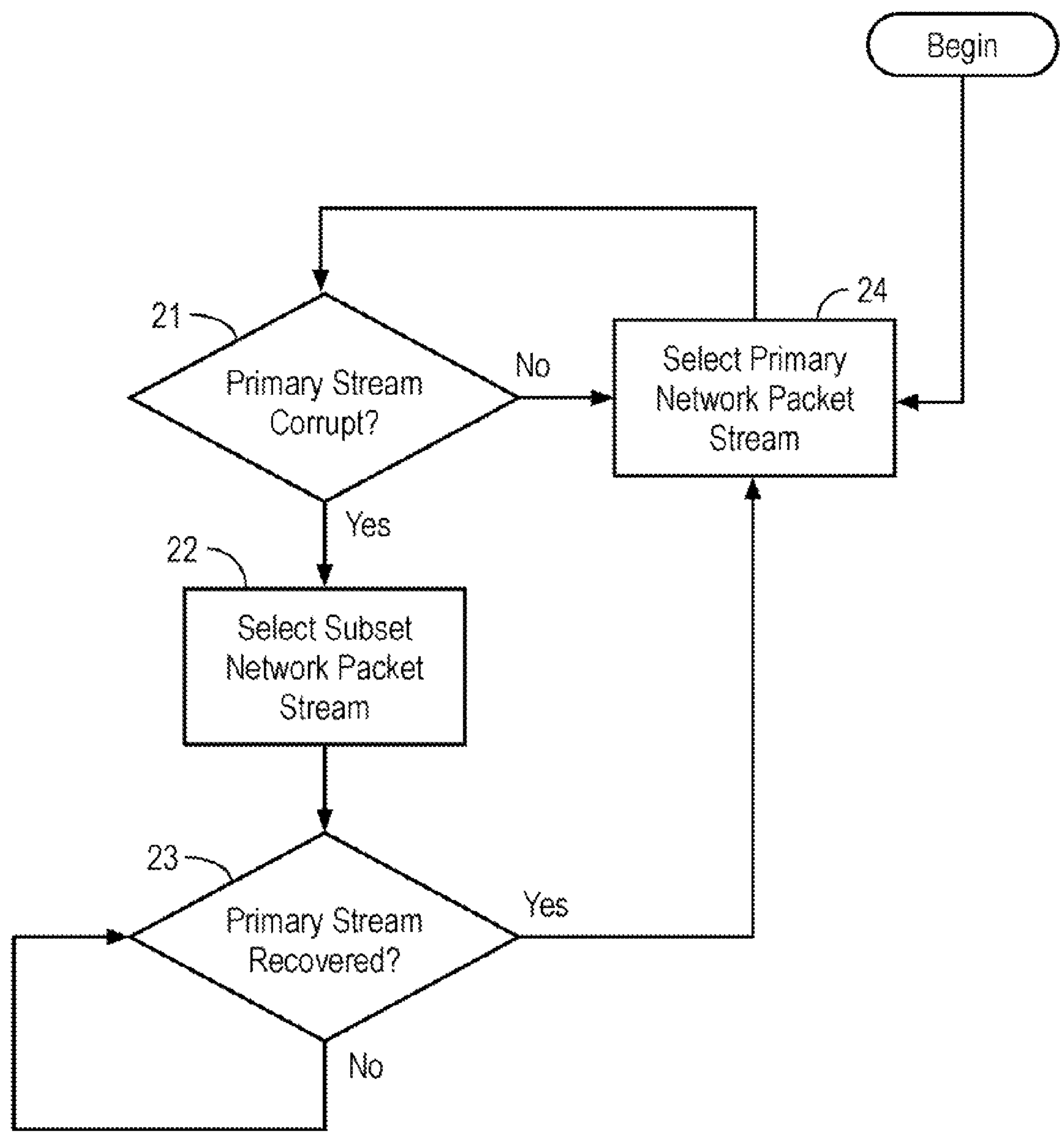
FIG. 2 is a flow diagram illustrating an example method for dealing with packet loss.

FIG. 2 is a flow diagram illustrating an example method for dealing with packet loss in correspondence with the network diagram of FIG. 1. The process may begin at block 24 with the arrival of a network packet, followed by the client-side device detecting whether the primary packet stream is corrupt. If it is not corrupt, the primary network packet stream continues to be selected (block 24) for subsequent decoding and rendering of reconstructed video frames on the client display device. On the other hand, if the primary stream is corrupted by a dropped or lost packet then the subset network packet stream is selected (block 22). The subset data are decoded and used to reconstruct the desired frame. This process may continue as long as the primary stream remains corrupt. At decision block 23, once the primary stream is recovered or is no longer corrupted (block 23) the primary network packet stream is once again selected and the normal packets are decoded, as described above.

Figure 3:
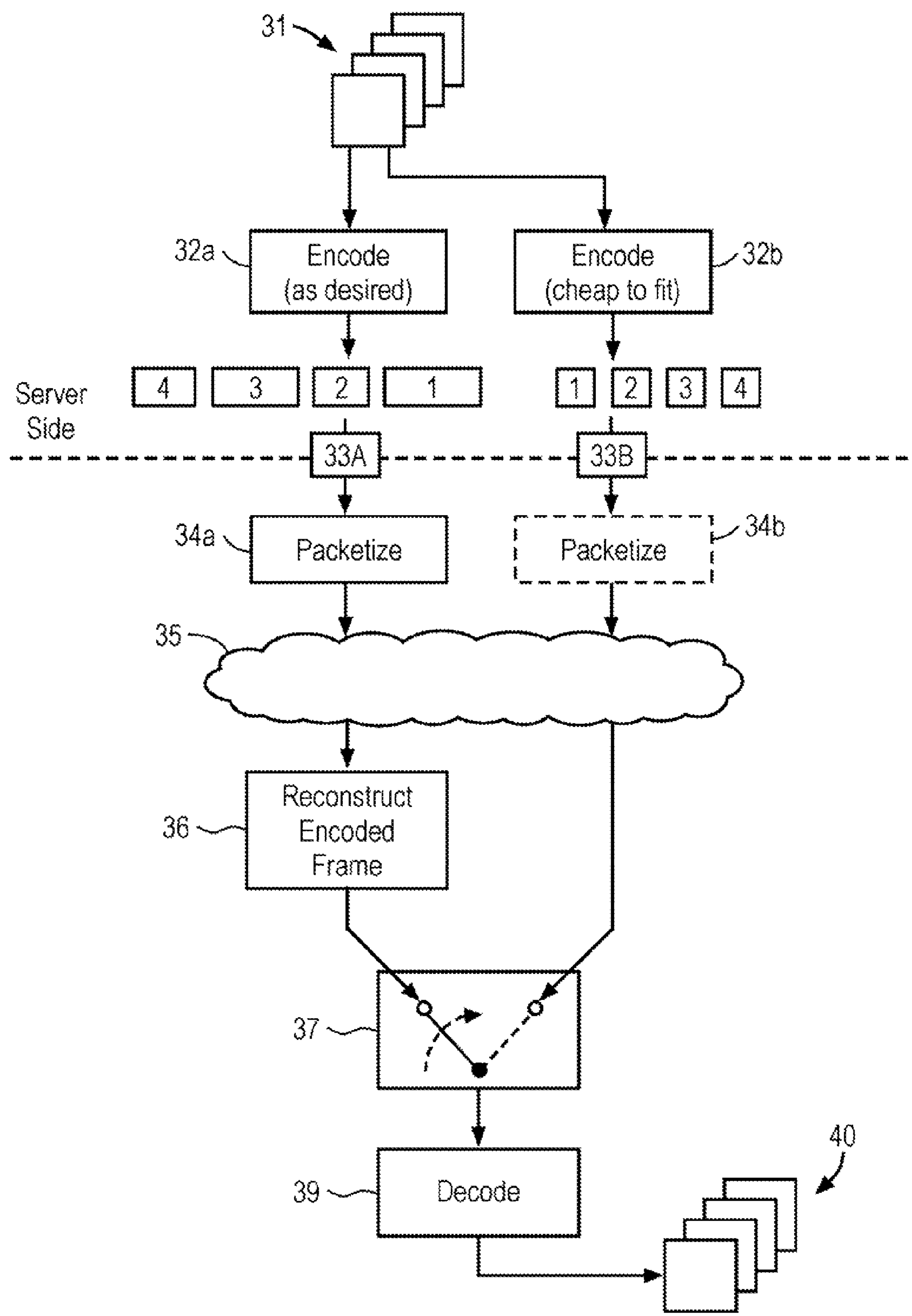
FIG. 3 is another example network diagram illustrating an embodiment for handling packet loss.

FIG. 3 is another example network diagram illustrating an embodiment for handling packet loss that is similar to that shown in FIG. 1. In this example, video frames 31 are encoded as desired by encoder 32*a* to produce a primary or normal video stream 33*a*. In addition, a separate encoding generates a less ideal stream 33*b* with each frame based on the previous frame of the primary stream but with the quality scaled such that a slice or frame neatly fits into a predetermined set of network packets, which could be a single packet. The normal video stream is packetized by packetizer 34*a* and transmitted over network 35. The secondary stream is also packetized for transmission over network 35. It is appreciated that the bandwidth of the secondary stream may be much lower as compared to the normal video stream.

At the client-side device, the encoded primary stream frames are reconstructed by a device 36 to replicate video stream 33*a*. A switching device 37 is utilized to select between the normal video stream and the secondary video stream. Whichever stream is selected, the received packets are then decoded by a decoder 39 to generate reproduced video frames 40 on the display of the client device. As in the previous embodiment, if a packet loss is detected on the client-side device, the secondary stream is selected by switching device 37. When the primary stream transmission recovers, the video stream switching device 37 switches back the primary or normal video stream.

It is appreciated by practitioners in the art that in order to maintain synchronicity between the client-side decoder and the server-side decoder (not shown), the client device may notify the server-side when it switches over to the secondary video stream. When lost or corrupted data packets have been detected and switching device 37 has selected the secondary stream, a processor associated with the client device utilizes the secondary video stream to construct a lower-quality, yet accurate, representation of the video frames.

Figure 4:
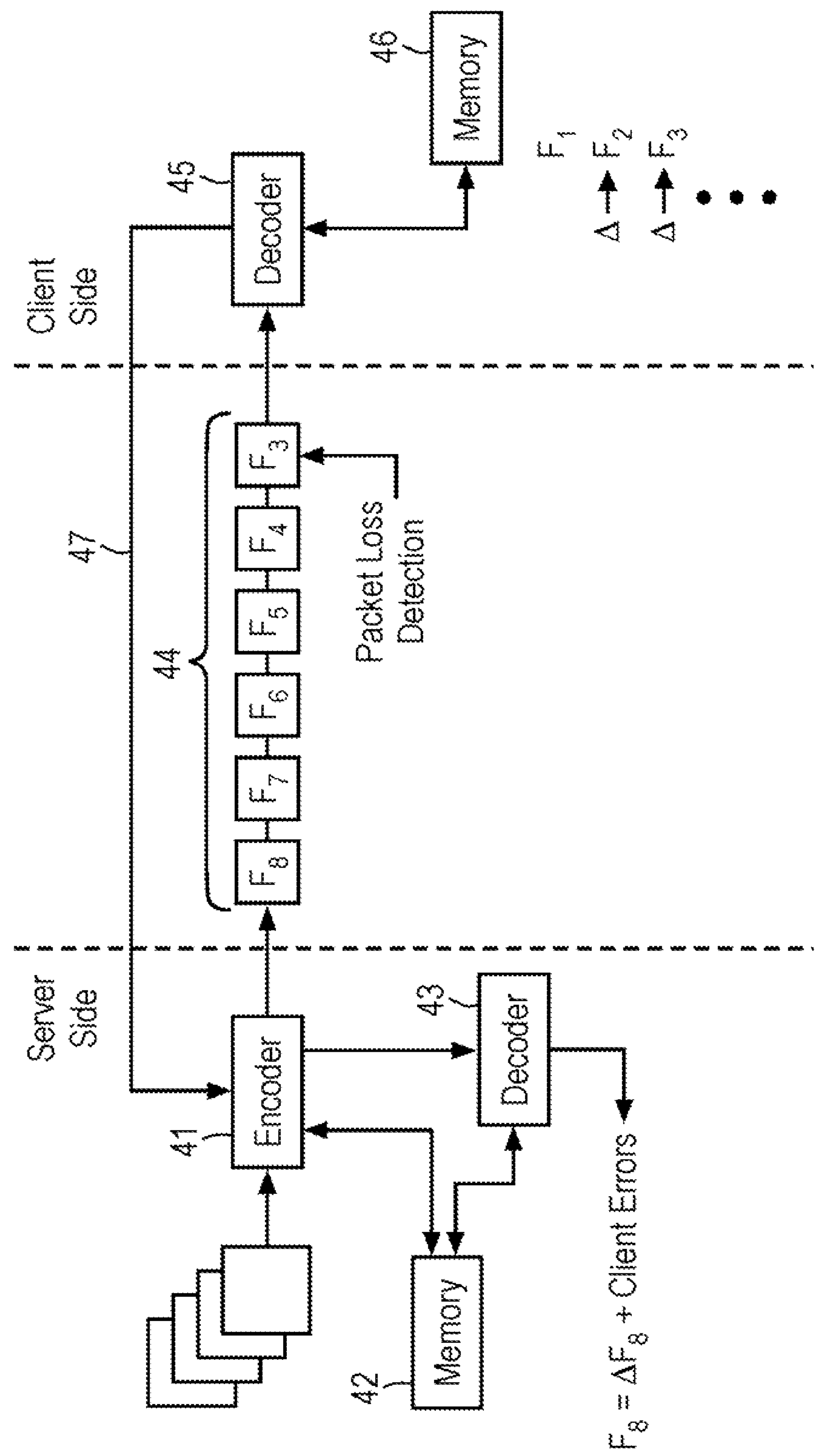
FIG. 4 is yet another example network diagram illustrating an embodiment for handling packet loss.

FIG. 4 is yet another example network diagram illustrating an embodiment for handling packet loss. In the embodiment shown, the server-side encoder 41 stores a copy of the encoded bits per slice/frame in an associated memory 42 (e.g., RAM, disk, etc.). These encoded frames may then be retrieved and individually decoded by decoder 43 for reconstruction of the client-side state. In this manner, encoder 41 can continue to feed encoded slices/frames to the client-side decoder 45, which is coupled to its own associated memory 46, even after packet loss. When packet loss does occur, decoder 45 (or a processor coupled with decoder 45) sends a notification to encoder 41 (or a processor controlling encoder 41) via feedback channel or loop 47. In response to the notification of packet loss, encoder 41 can utilize decoder 43 and the stored encoded bits/frames to determine exactly what happened at decoder 45 on the client side. In this way, the server can keep itself aware of client state even when the client has received erroneous transmissions.

In the example shown in FIG. 4, encoder 41 has encoded frames $F_1$-$F_7$ and sent them over a transmission network to the client device. By way of example, the first frame, $F_1$, may be an I-frame, followed by a sequence of P-frames that are calculated predictively based on a difference or delta ($\Delta$) from the previous I-frame or P-frame. Thus, the second frame, $F_2$, is decoded as a delta from $F_1$, the third frame, $F_3$, is decoded as a delta from $F_2$, and so on. As shown, the third frame, $F_3$, is last or corrupted. When this is detected at decoder 45, a notification is sent to encoder 41 via feedback loop 47, notifying encoder 41 that the last good frame received was $F_2$. In response to the notification, server-side encoder 41 generates the eighth frame, $F_8$, predictively as a delta from the last good frame, $F_2$. To do this and maintain state synchronicity between the server and client sides, encoder 41 constructs $F_8$ from $F_2$, taking into account all of the client errors resulting on the client-side due to the loss of $F_3$, and the subsequent frames. Utilizing decoder 43 and the stored encoded bits in memory 42, encoder determines exactly what each of the packets subsequent to the lost packet (e.g., $F_4$-$F_8$) would look like, taking into consideration the client-side errors that have occurred.

Figure 5:
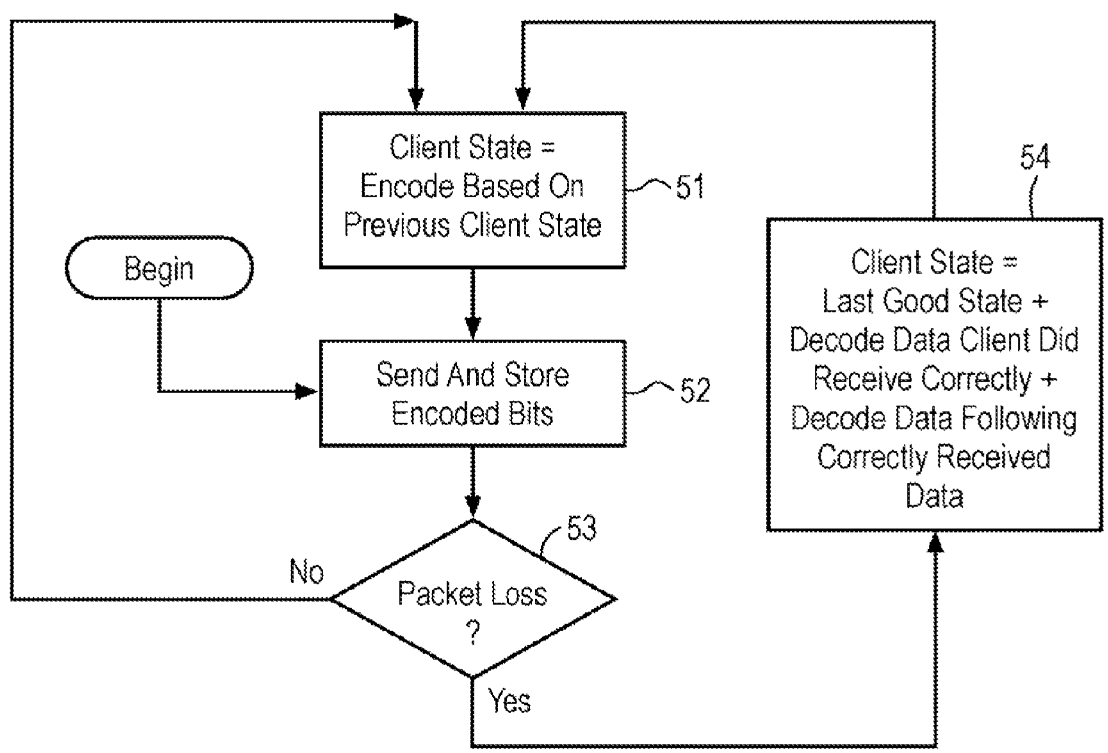
FIG. 5 is a flow diagram illustrating another example process flow for handling packet loss.

FIG. 5 is a flow diagram illustrating an example process flow wherein the server-side encoder keeps encoding frames for reconstruction of the client state following packet loss. With the server-side encoder having transmitted an I-frame, the next frame (e.g., P-frame) is encoded based on the previous client state. (Block 51) At block 52, the server-side encoder sends the encoded bits to the client device and also stores a copy of these same bits in an associated memory. At decision block 53, the server-side encoder queries whether a notification of packet loss has been received from the client-side decoder. If not, the encoder continues encoding frames based on the previous client state. (Block 51)

On the other hand, if packet loss was detected and a notification received by the encoder, the server-side calculates the client state from the last known good state (before packet loss) and the decode data that the client received correctly, plus the decode data that followed the correctly received data. (Block 54) This later decode data comprises the client errors resulting from the packet loss. The process then continues at block 51, with the encoder coding the next frame based on the previous client state, with the previous client state now being that calculated from block 54.

Figure 6:
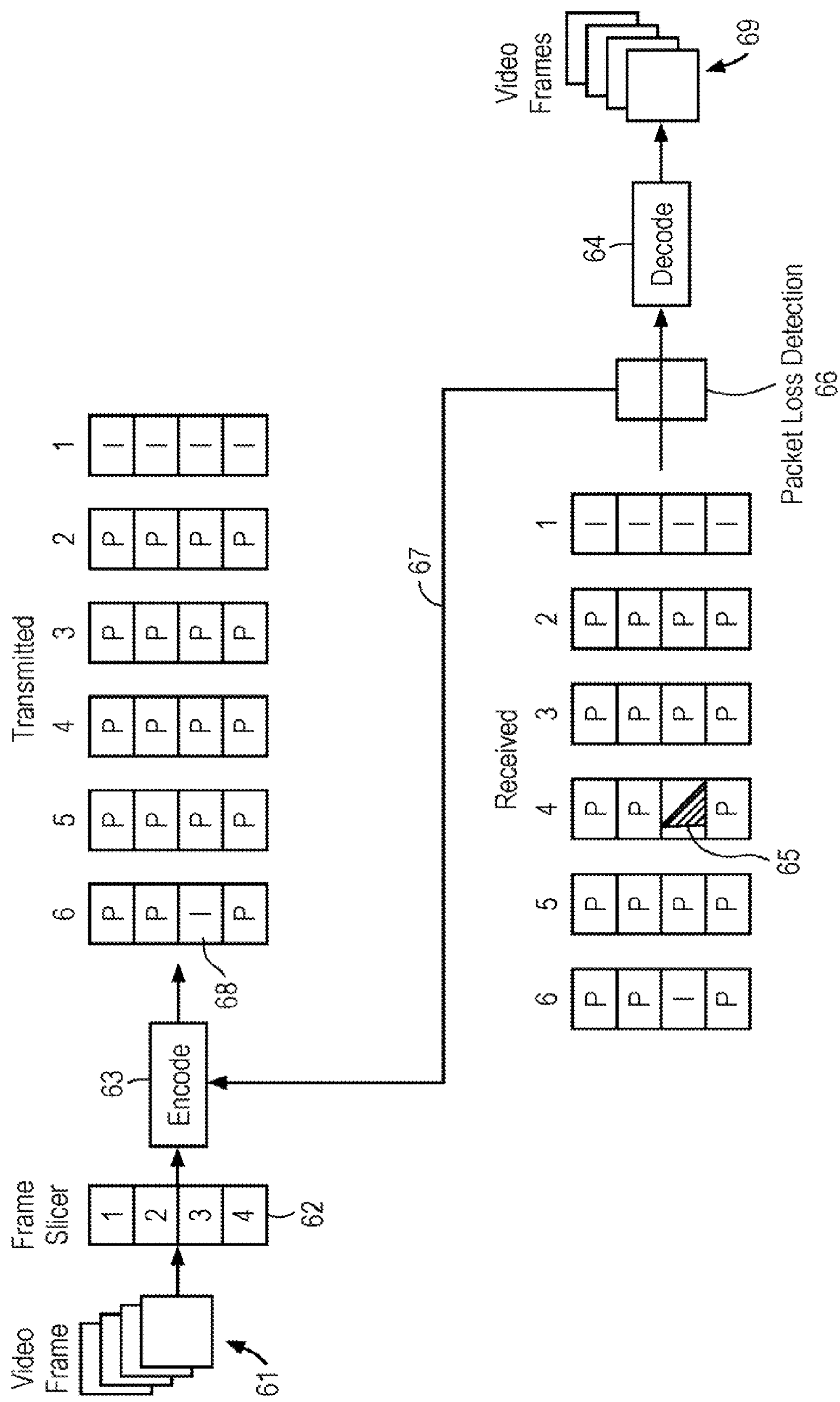
FIG. 6 is still another example network diagram illustrating an embodiment for handling packet loss.

FIG. 6 is still another example network diagram illustrating a slice-based recovery technique for overcoming packet loss. This embodiment may be used for video frames 61 that are divided into two or more slices. For instance, in this example a frame slicer 62 is shown dividing a video frame into four slices, which are then encoded by client-side encoder 63 and transmitted to the client-side decoder 64. Decoder 64 generates reconstructed video frames 69 for display on the client device.

In FIG. 6, six frames, each having four slices, are shown transmitted by encoder 63. The first frame comprises four I-slices, the second frame comprises four P-slices, the third frame comprises four P-slices, and so on. Over on the client-side, decoder 64 is shown receiving frames 1-3 without incident. However, frame 4 is shown being received with the data for the third slice, denoted by reference numeral 65, having been lost during network transmission. When lost data is detected by decoder 64, or by a packet loss detection device 66, a notification is sent back to encoder 63 via feedback channel or loop 67. In this example, the notification is received by encoder 63 immediately following transmission of frame 5, which comprises four P-slices. Responsive to the notification of lost data in the third slice, encoder encodes the next frame (frame 6) with slice 3 as an I-slice, as denoted by reference numeral 68.

The embodiment of FIG. 6 thus performs frame repair by repairing individual slices for which data has been lost. Practitioners in the art will appreciate that this embodiment has the advantage of avoiding the standard practice of insuring that a video stream contains a certain density of I-frames, which are very large and costly to transmit. Instead of sending an I-frame say, every two seconds (as in the case of DVD or on-demand video transmissions that lack feedback) the embodiment of FIG. 6 relies upon P-slice transmission for frames subsequent to the initial frame, and then implements slice-based recovery by transmitting an I-slice at the slice position where lost slice data was detected at the client device.

Practitioners will further appreciate that for optimal results, a single network packet should not contain data for more than a single slice.

Figure 7:
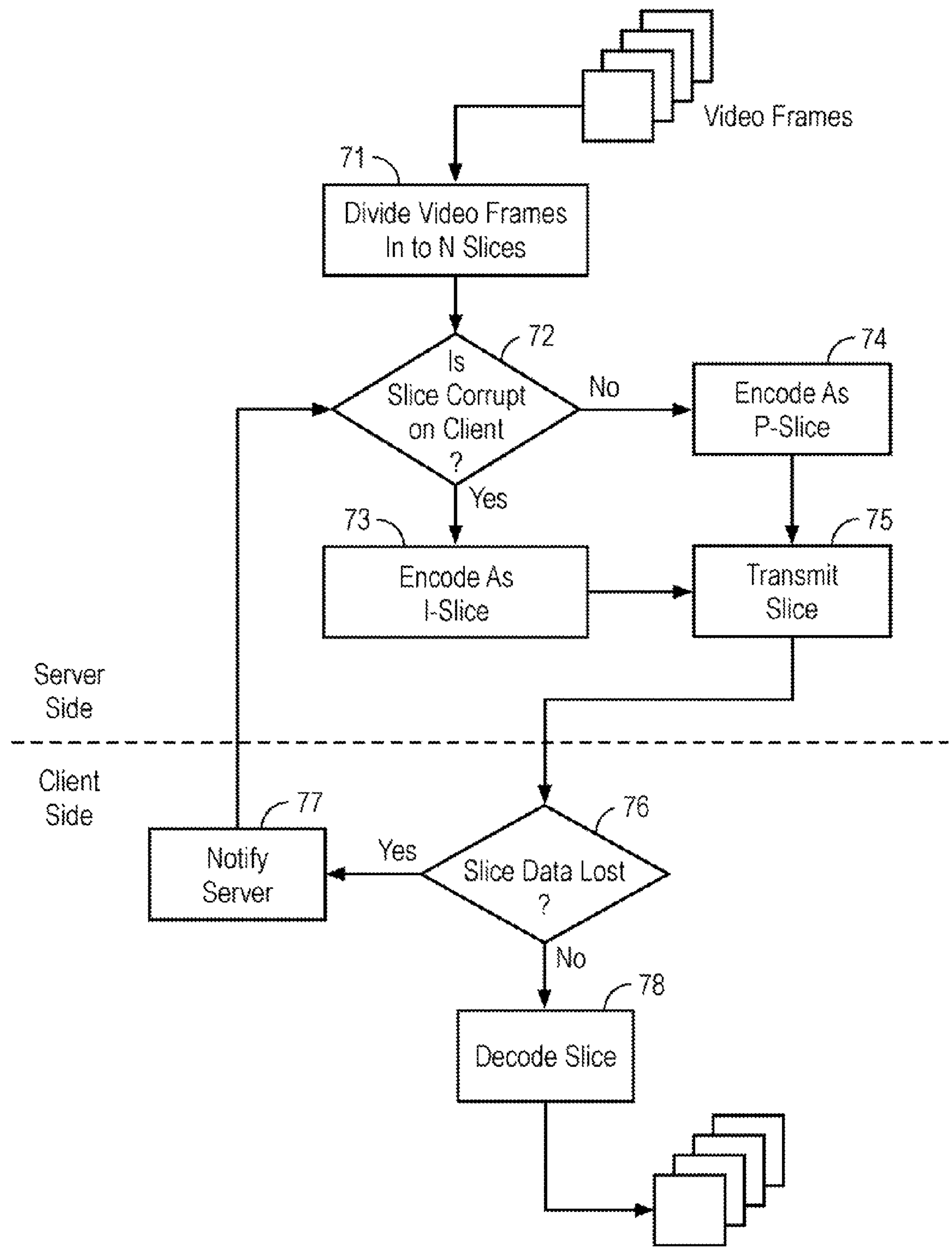
FIG. 7 is a flow diagram illustrating an example process flow for dealing with packet loss.

FIG. 7 is a flow diagram illustrating an example process flow for slice-based recovery from lost data packets. On the server-side, video frames are divided into N, where N is an integer >1, slices. (Block 71) At decision block 72, the hosting service queries whether it has received a notification from the client device indicative of a lost data slice. If no such notification has been received, it proceeds to encode each of the slices in the frame as P-slices (block 74), which are then transmitted to the client device (block 75). If, on the other hand, the hosting service has received a notification that the data of a particular slice has been lost during network transmission, the corresponding slice in the current (i.e., next) frame is encoded as an I-slice. (Block 73) That I-slice is then transmitted over the network to the client device. (Block 74).

On the client side, incoming packets/slices may be checked for data integrity. (Block 76) If data is lost for a particular slice, the server at the hosting service center is immediately notified. (Block 77) If no data is lost, then each slice received is decoded (block 78) in order to reconstruct the video frames for rendering on the client-side display device.

It should be understood that elements of the disclosed subject matter may also be provided as a computer program product which may include a machine-readable medium having stored thereon instructions or code which may be used to program a computer (e.g. a processor or other electronic device) to perform a sequence of operations. Alternatively, the operations may be performed by a combination of hardware and software. The machine-readable medium may include, but is not limited to, floppy diskettes, optical disks. CD-ROMs, and magneto-optical disks, ROMs, RAMS, EPROMs, EEPROMs, magnet or optical cards, or other type of machine-readable medium suitable for storing electronic instructions.

The above description of illustrated example embodiments, including what is described in the Abstract, are not intended to be exhaustive or to be limitation to the precise forms disclosed. While specific embodiments and examples of the subject matter described herein are for illustrative purposes, various equivalent modifications are possible without departing from the broader spirit and scope of the present invention.

I claim:

1. A method for delivering video over a network comprising:

encoding, by a server, a moving picture which includes a sequence of video frames as a primary compressed video stream comprising an initial I-frame followed by a plurality P-frames;

encoding, by the server, the sequence of video frames as a secondary compressed video stream comprising a subset of the primary compressed video stream which includes motion vectors for each video frame;

transmitting the primary compressed video stream and the secondary compressed video stream over a network to a client device, wherein the client device is configured to select the primary compressed video stream for decoding in the absence of packet loss, and to select the secondary compressed video stream for decoding if packet loss is detected, the decoding used to produce a client-side video stream;

receiving a feedback from the client device, the feedback indicating one or more video frames not successfully received by the client device due to packet loss;

replicating, using the feedback, the client-side video stream at the server, the replicating including decoding the primary compressed video stream without the one or more frames not successfully received to produce a server-side video stream;

continuing to transmit the primary compressed video stream and the secondary compressed video stream to the client device, wherein one or more new video frames of the primary compressed video stream are generated based on the server-side video stream to account for the one or more frames not successfully received.

2. The method of claim 1 further comprising packetizing each of the primary and secondary compressed video streams prior to transmission.

3. The method of claim 1 wherein the subset further includes residual video information.

4. The method of claim 1 wherein the primary compressed video stream and the secondary compressed video stream are transmitted substantially simultaneously.

5. The method of claim 1 further comprising switching back from the secondary compressed video stream to the primary compressed video stream once the primary compressed video stream is recovered.

6. The method of claim 1 wherein the primary compressed video stream is encoded to a first set of parameters.

7. The method of claim 1 wherein the secondary compressed video stream is encoded to a second set of parameters that are reduced as compared to the first set of parameters.

8. The method of claim 6 further comprising packetizing the primary compressed video stream prior to transmission, with each frame being transmitted as one or more network packets.

9. The method of claim 1 wherein the secondary video stream is encoded with a quality scaled such that each slice, or all slices, of a frame fits into a single network packet.

10. The method of claim 1 further comprising receiving, by the server, a notification sent by the client device when it selects the secondary compressed video stream.

11. The method as recited in claim 1, wherein the client-side video stream and the server-side video stream are substantially the same.

12. The method as recited in claim 1, wherein the one or more new video frames are generated as P-frames.

13. The method as recited in claim 1, wherein the one or more new video frames are generated predictively as a delta from a video frame preceding the one or more video frames not successfully transmitted.

14. A non-transitory computer-readable storage medium encoded with a computer program, when executed the computer program being operable to:

encode, by a server, a moving picture which includes a sequence of video frames as a primary compressed video stream comprising an initial I-frame followed by a plurality P-frames;

encode, by the server, the sequence of video frames as a secondary compressed video stream comprising a subset of the primary compressed video stream which includes motion vectors for each video frame;

transmit the primary compressed video stream and the secondary compressed video stream over a network to a client device, the client device configured to decode the primary and secondary compressed video streams to produce a client-side video stream;

receive a feedback from the client device, the feedback indicative that one more video frames have not been successfully received by the client device due to packet loss, the feedback usable to identify the one or more frames not successfully received;

replicate, using the feedback, the client-side video stream at the server by decoding the primary compressed video stream without the one or more video frames to produce a server-side video stream;

continue to transmit the primary compressed video stream and the secondary compressed video stream to the client device, wherein one or more new video frames are encoded based on the server-side video stream to account for errors associated with the client-side video stream due to the one or more video frames not successfully transmitted.

15. The non-transitory computer-readable storage medium of claim 14 wherein the computer program, when executed, is further operable to select the primary compressed video stream for decoding in the absence of packet loss, if packet loss is detected, the secondary compressed video stream being selected for decoding.

16. A method for delivering a compressed video stream over a network, comprising:

encoding, by an encoder associated with a server, a moving picture including a sequence of video frames, the encoding producing a compressed video stream;

transmitting the compressed video stream to a client device, the client device configured to decode compressed video stream into a client-side video stream;

receiving a feedback from the client device, the feedback indicating one or more video frames not successfully received by the client device;

replicating, using the feedback, the client-side video stream at the server, the replicating including decoding the compressed video stream excluding the one or more video frames not successfully received, the replicating producing a server-side video stream that is in synchronicity with the client-side video stream;

transmitting a new compressed video frame to the client device, the new compressed video frame generated at least partially based on the server-side video stream, wherein the new compressed video frame at least partially accounts for errors associated with the client-side video stream due to the one or more video frames not successfully received.

17. The method as recited in claim 16, further comprising: storing, at a memory associated with the server, a copy of the compressed video stream, the copy retrievable for replicating the client-side video stream at the server.

18. The method as recited in claim 16, wherein the new compressed video frame is a compressed P-frame.

19. The method as recited in claim 16, wherein the new compressed video frame is generated predictively as a delta from a video frame known to have been successfully received.

20. The method as recited in claim 16, wherein the compressed video stream is encoded as a primary compressed video stream and a secondary compressed video stream, wherein the client device is configured to decode the primary compressed video stream in the absence of packet loss and to decode the secondary compressed video stream if packet loss is detected.

* * * * *